UNITED STATES PATENT OFFICE.

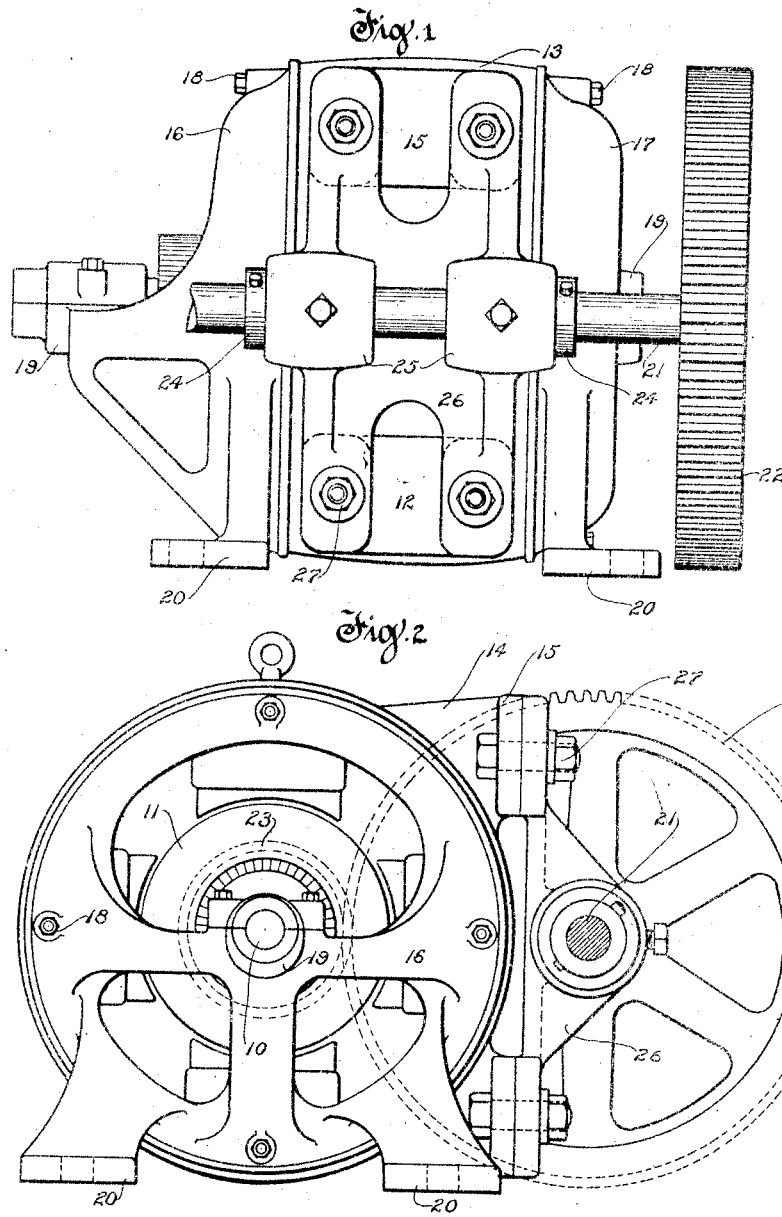

ALEXANDER M. GRAY, OF MILWAUKEE, WISCONSIN, ASSIGNOR TO ALLIS-CHALMERS COMPANY, A CORPORATION OF NEW JERSEY.

BACK-GEARED MOTOR.

983,361.

Specification of Letters Patent.

Patented Feb. 7, 1911.

Application filed February 28, 1910. Serial No. 546,542.

*To all whom it may concern:*

Be it known that I, ALEXANDER M. GRAY, a subject of the King of England, residing at Milwaukee, in the county of Milwaukee and State of Wisconsin, have invented certain new and useful Improvements in Back-Geared Motors, of which the following is a full, clear, and exact specification.

This invention relates to dynamo-electric machines, and particularly to back-geared electric motors.

In driving machinery or apparatus at low speed by electric motors, it is sometimes necessary to employ a back-geared shaft or counter shaft with speed-reducing gearing between the counter shaft and main shaft of the motor, in order to obtain sufficiently low speed for the apparatus driven by the motor. It is generally desirable that the motor and back-geared shaft be in the form of a unit and that the back-geared shaft be so supported on the motor frame that it may be adjusted circumferentially relatively to the main motor shaft, so that the motor may be placed in various positions relative to the driven machinery or apparatus. It is also desirable that as many parts or as much as possible of a standard motor be employed in the construction of a back-geared motor in order that the cost of the latter will not be excessive.

The object of the present invention is to provide a back-geared motor, which contains very few special parts not employed in a standard motor and is thus inexpensive and simple in construction, and which is provided with a back-geared shaft so supported on the motor frame that it is capable of adjustment circumferentially about the main motor shaft.

In carrying out my invention I provide a back-geared motor having a counter or back-geared shaft which is supported on the field yoke of standard construction and preferably upon the base of the yoke which in a standard motor is utilized for supporting the motor. Instead of supporting the motor by the field yoke as in the usual motor construction, I employ special end heads or housings to which the yoke is bolted and support the motor by suitable feet or bases provided on the end heads. The yoke and end heads are secured together by equally spaced bolts so that the yoke and back-geared shaft may be secured in various positions relative to the main shaft by removing the bolts, turning the yoke through an arc equal to one or more times the spacing of the bolts and by again tightening the bolts.

For a better understanding of my invention, reference is had to the accompanying sheet of drawings in which—

Figure 1 is a side elevation of a back-geared motor constructed in accordance with my invention, the back-geared shaft or counter shaft being arranged at one side of the motor frame; and Fig. 2 is an end view of the same.

Referring now to the figures of the drawing, 10 represents the main shaft of the motor, and 11 the armature which may be of the usual or standard construction, and 12 represents as a whole the field frame. As is well known, the frame of a direct current motor usually consists of a field yoke having a base by means of which the motor is supported and is bolted to any suitable supporting member, and end heads or housings which are bolted to the yoke and carry the bearings and bearing housings for the motor shaft. In this case I employ in the frame a yoke 13 which is of standard construction and has projecting portions comprising an integrally formed base 14 and feet 15 on which the motor is ordinarily supported, and I employ in the frame end heads or housings 16 and 17 which are secured by equally spaced bolts 18 to the yoke and are provided with bearing housings 19 containing the usual bearings in which the main motor shaft 10 is journaled. Each of the end heads is provided with bearing or supporting feet 20 for supporting the motor, the feet 20 being adapted to be bolted to a support in the same manner that the feet on the base of a standard motor yoke are bolted.

The feet 15 of the yoke are utilized for supporting the back-geared shaft or counter shaft which is designated by the reference character 21 and is connected to the main shaft 10 of the motor by speed-reducing gearing, the back-geared shaft having a large gear wheel 22 which meshes with a comparatively small gear wheel 23 shown by dotted lines in Fig. 2. The back-geared shaft 21 is journaled in bearings 24 carried by bearing housings 25 which are preferably formed integral with a bracket 26 which is secured by bolts 27 to the feet 15 of the yoke.

It will be seen that as far as the motor armature and frame are concerned, only two special parts need be employed, namely, the end heads or housings 16 and 17. It will be seen also that the motor will be as firmly supported, and probably more firmly, than if it were supported on the feet of the yoke. The back-geared shaft, which, as here shown, is arranged at the side of the motor frame, may, with the arrangement and number of bolts, which are employed for securing the end heads to the yoke, be arranged in four different positions, namely, on either side of the frame, at the top of the frame or at the bottom of the frame, the field yoke 13 being capable of adjustment through arcs equal to one or more times the spacing of the bolts 18. It will be understood, of course, that if more than four bolts 18 are employed for securing each end head to the yoke, the back-geared shaft may be arranged in more positions relative to the main motor shaft 10. The back-geared motor, which I have provided, is, therefore, inexpensive to manufacture, is rigid and quite free from vibration, and in fact is satisfactory in all respects.

I do not desire to be confined to the exact details shown but aim in my claims to cover all modifications which do not involve a departure from the spirit and scope of my invention.

What I claim as new and desire to secure by Letters Patent is:

1. In a dynamo-electric machine, a main shaft, a frame comprising a field yoke and end heads which have supporting portions and which are secured to the yoke and support the main shaft, and a counter shaft supported on the yoke, said end heads being stationary and said yoke being adjustable relatively thereto.

2. In combination, in a motor, a main shaft, a frame comprising a yoke and end heads which have supporting members and which are secured to the yoke, a plurality of bearings supported on said yoke, and a counter shaft mounted in said bearings, the motor being supported independently of the yoke.

3. In combination, in a motor, a main shaft, a frame comprising a movable yoke and stationary end heads which have supporting portions and which are secured to the yoke, and a counter shaft mounted on the yoke.

4. An electric motor having an armature and armature shaft, a field frame comprising a yoke and end heads secured to the yoke, the end heads having bearings for the armature shaft and having feet for supporting the motor, and a back-geared shaft mounted upon the yoke.

5. An electric motor having a main shaft, a field frame comprising end heads and a yoke which is adjustable relative to the end heads, the end heads having supporting feet for the motor and having bearings for the main shaft, and a back-geared shaft supported by said yoke.

6. A back-geared motor having a main shaft, a field frame comprising end heads having projecting portions and which support the main shaft, and a yoke which is adjustably secured to the end heads and is provided with projecting portions, and a counter shaft geared to the main shaft and supported on said projecting portions of the yoke, the supporting portions of the end heads and yoke being capable of being disposed at an angle with each other.

7. An electric motor having a main shaft, a frame comprising end heads which support the main shaft and are provided with feet for supporting the motor and a yoke which is bolted to the end heads and is adjustable circumferentially relatively thereto, said yoke having a supporting portion, a counter shaft geared to the main shaft, and a supporting bracket for the counter shaft bolted to the supporting portion of said yoke.

8. In combination, in a motor, a main shaft, a frame comprising a movable yoke having standard feet and end heads which are secured to the yoke, said end heads also having standard feet, and a counter shaft supported on the feet of said yoke, the feet of said end heads and yoke being capable of being disposed at an angle with each other.

9. In a dynamo-electric machine, stationary end heads having supporting feet, a yoke relatively rotatable with respect to said end heads, equally circumferentially spaced members for securing said end heads to said yoke, and a counter shaft carried by said yoke.

10. In a dynamo-electric machine, stationary end heads having supporting members, a yoke relatively rotatable with respect to said end heads, equally circumferentially spaced bolts for securing said end heads to said yoke, and a counter shaft carried by said yoke.

Milwaukee, Wis., Feb. 23, 1910.

In testimony whereof I affix my signature, in the presence of two witnesses.

ALEXANDER M. GRAY.

Witnesses:
 CHAS. L. BYRON,
 ROB. E. STALL.